Jan. 3, 1967 D. C. MORTON 3,296,513
REVERSING MOTOR CONTROL INCLUDING LOAD SENSING TO DETERMINE
OPTIMUM REVERSAL POINT
Filed Aug. 9, 1963 4 Sheets-Sheet 1

INVENTOR.
David C. Morton
BY

Fig. 4

INVENTOR.
David C. Morton
BY

INVENTOR.
David C. Morton

United States Patent Office 3,296,513
Patented Jan. 3, 1967

3,296,513
REVERSING MOTOR CONTROL INCLUDING
LOAD SENSING TO DETERMINE OPTIMUM
REVERSAL POINT
David C. Morton, Buffalo, N.Y., assignor, by mesne assignments, to Bethlehem Steel Corporation, a corporation of Delaware
Filed Aug. 9, 1963, Ser. No. 301,114
25 Claims. (Cl. 318—265)

The present invention relates generally to electrical circuitry which senses an increase in the current flowing through a reversible electric motor arising from the application of mechanical load to the said motor, which discriminates between such increase and other increases in motor current arising from acceleration and/or deceleration thereof, and which produces an electrical signal unequivocally indicating the application of said mechanical load to the motor.

More specifically, the present invention relates to electrical circuitry associated with a reversible rolling mill motor, which electrical circuitry senses variations in current flowing through the armature of the motor arising from the presence or absence of an ingot in the rolls of the rolling mill driven by the said motor, which discriminates between such variations and other variations in the motor armature current arising from acceleration or deceleration of the motor at the beginning or end of a pass of the ingot through the rolls of the associated rolling mill, and which signals to the automatic control equipment operating the rolling mill plant the presence or absence of an ingot in the rolls.

Very briefly, the present invention in the preferred embodiment comprises:

(1) first means electrically responsive to the voltage drop across the commutating field winding of the electric motor driving one of the rolls of a pair of rolls, which first means is adapted to produce an electrical output changing abruptly when the said voltage drop increases above its no-load value, (2) second means electrically responsive to the voltage across the terminals of the electrical generator supplying the above-mentioned motor with power, which second means is adapted to produce an electrical output changing abruptly when the voltage across the generator terminals rises to a predetermined value, (3) third means electrically responsive to the electrical output of said second means, which third means abruptly changes its electrical output a predetermined interval of time after the change in electrical output of said second means, and (4) fourth means electrically responsive to the electrical outputs of said first and third means, which fourth means is adapted to produce an electrical output changing abruptly when the electrical outputs of both of said first and third means reach a predetermined value, the said electrical output of said fourth means in the last-mentioned instance indicating the presence or absence of an ingot in the rolls.

One of the objects of this invention is to provide electrical circuitry in association with a reversible electric motor which indicates the application of mechanical load to the motor.

Another object of this invention is to provide electrical circuitry in association with a reversible electric motor which senses an increase in the current flowing through said motor, arising from the application of mechanical load to the said motor, which discriminates between such increase and other increases in motor current arising from acceleration thereof, and which produces an electrical signal indicating the application of said mechanical load to the motor.

A further object of this invention is to provide electrical circuitry in association with a reversible rolling mill motor, which senses variations in current flowing through the armature of the motor arising from the presence or absence of an ingot in the rolls of the rolling mill driven by the said motor, which discriminates between such variations and other variations in the motor armature current arising from acceleration or deceleration of the motor at the beginning or end of a pass of the ingot through the rolls of the associated rolling mill, and which produces an electrical signal indicating the presence or absence of the ingot in the rolls of the rolling mill.

Yet another object of this invention is to provide electrical circuitry in association with a reversible rolling mill and in association with the automatic control apparatus operating said reversible rolling mill, which electrical circuitry transmits to the automatic control apparatus a signal indicating the presence or absence of an ingot in the rolls, thereby permitting faster turnaround between passes of the ingot through the rolling mill.

Still a further object of this invention is to provide electrical circuitry in association with a reversible rolling mill which permits a reduction in the overall rolling time for an ingot and therefore reduces the cost of rolling the ingot.

Another object of this invention is to provide electrical circuitry employing static switch elements or logic elements, including saturable reactors, in combination for all of the foregoing purposes.

Other and further objects of this invention will become apparent during the course of the following description.

Referring now to the drawings, in which like numerals represent like parts in the several views.

The operation of rolling an ingot, and a conventional reversible rolling mill with conventional means for signalling ingot position to the automatic control apparatus will first be briefly described, as this permits an appreciation of the advantages of the circuitry comprising this invention over conventional ingot-position-indicating means, and therefore makes evident the contribution to this art of the circuitry of this invention.

Ingots may be reduced or altered in cross-section to blooms, slabs or billets, etc., by being passed back and forth several times through one or more pair of reversible rolls in a series of passes (odd and even), the opening between the rolls of each pair being reduced between passes, the ingot passing completely out from between the rolls of each pair before the roll spacing adjustment for the next draft on the ingot by the said pair of rolls is made. This operation is continued until the desired ingot cross-section is obtained. It is apparent that the time required to roll an ingot will depend, inter alia, upon the amount of travel of the ingot out of and beyond the rolls after one pass therethrough and, of course, the distance the ingot must travel to return to and enter the rolls for the succeeding pass therethrough. It is also apparent that the less the travel of the ingot out of and beyond the rolls between passes, the shorter will be the interval between passes, the shorter will be the overall rolling time for the ingot, and the cost of rolling the ingot will be less.

Figures 1, 2:
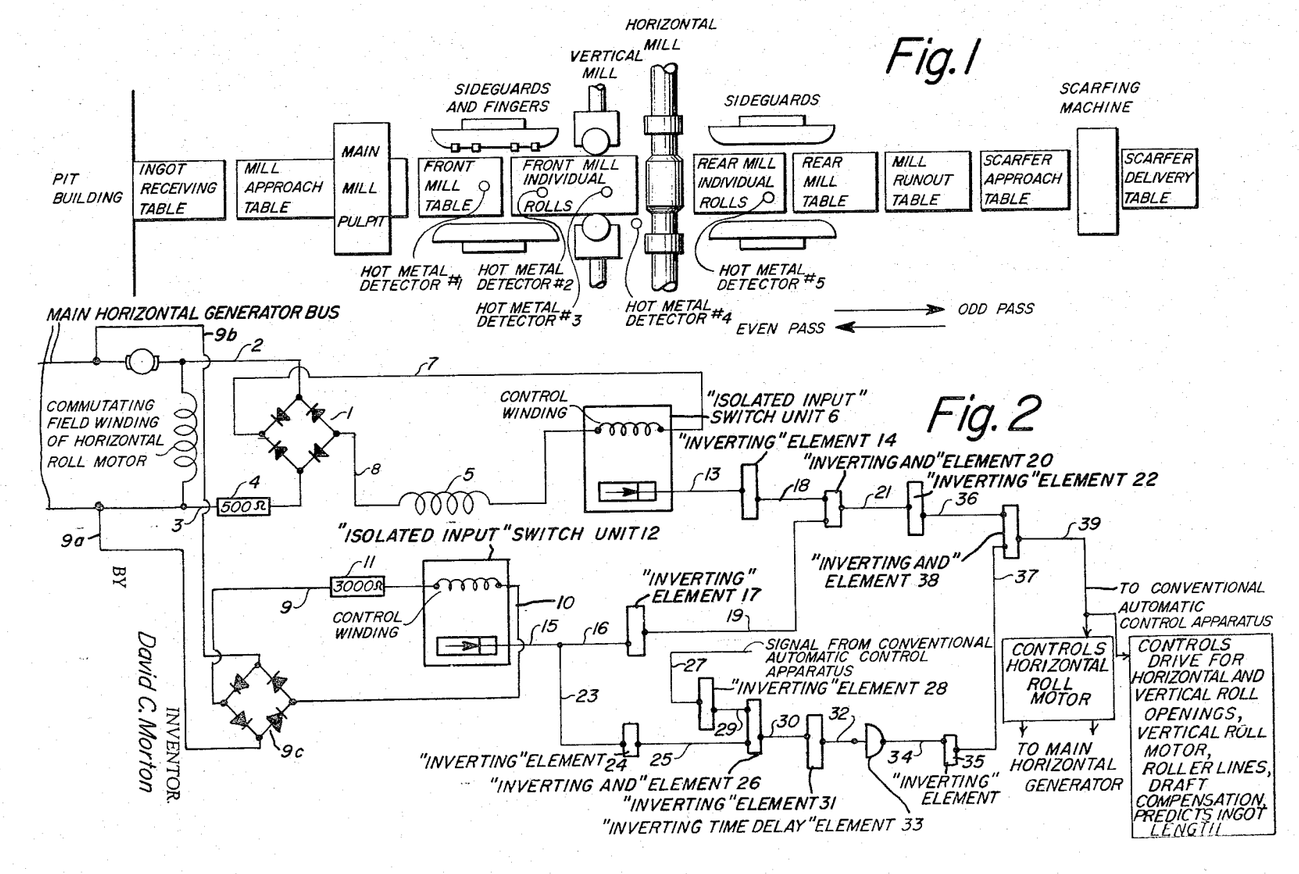
FIGURE 1 represents diagrammatically a layout of one type of reversible rolling mill, viz. a slabbing mill.
FIGURE 2 represents schematically the electrical circuitry comprising the present invention.

The layout of one type of reversible rolling mill plant is shown in FIGURE 1. The slabbing mill therein illustrated is seen as comprising a horizontal mill or pair of rolls functioning to reduce the ingot cross-section to that of the desired slab, a vertical mill or pair of rolls functioning to "edge" the slab during the rolling operation, and other elements designated as shown in FIGURE 1 and whose functions are well known to those familiar with this art.

The ingot to be rolled, after being heated to approximately 2300° F. in a soaking pit in the pit building, is transferred to the ingot receiving table. The mill operator in the main mill pulpit or control station, through manually operated controls, transfers the ingot to the mill approach table and thence to the front mill table. Then, the mill operator actuates automatic control apparatus which takes command of the rolling operation.

The automatic control apparatus is conventional. One such apparatus, known as the "Direct-O-Matic Programming Control System" is manufactured and sold by General Electric Co. A similar apparatus, known as "Prodac," is manufactured and sold by Westinghouse Electric Corp.

The automatic control apparatus performs the following main functions in response to coded instructions on a properly punched program card:

(a) It positions the drives for the horizontal and vertical roll openings, thereby adjusting the roll openings between passes and the pressure of the rolls against the ingot during passes.

(b) It starts, stops and controls the speed and direction of rotation of the horizontal and vertical rolls.

(c) It starts, stops and controls the speed and direction of the various roller lines on either side of the main or horizontal rolls.

(d) It sets the draft compensation between the horizontal and vertical rolls, to insure that the lineal velocity of the ingot past the horizontal rolls is the same as that through the vertical rolls.

(e) It counts out the length of the ingot in one pass, predicts the increase in length of the ingot during the next pass, and decelerates the horizontal rolls towards the end of the said next pass in anticipation of the ingot leaving the horizontal rolls, thereby reducing the exit speed of the ingot and preventing the same from "shooting" far beyond the said rolls.

Obviously, it is necessary to the optimum and most efficient operation of this automatic control apparatus that it receive accurate and prompt information concerning the position of the ingot in the mill. Conventionally, the position of the ingot, which is rolled at an elevated temperature ("hot rolled"), is sensed by hot metal detectors spaced at various stations in the mill on either side of the horizontal rolls. These hot metal detectors convert the radiation of heat energy from the hot ingot into electrical energy, the latter being amplified to provide a substantially continuous flow of electrical signals to the automatic control apparatus indicating the presence or absence of the ingot adjacent the hot metal detectors.

FIGURE 1 shows the location of the five hot metal detectors conventionally employed in a typical slabbing mill. At the beginning of the first odd pass, in response to the command of the automatic control apparatus, the horizontal and vertical roll drives will position to the programmed openings and then the horizontal and vertical rolls and the roller lines will run forward at the programmed rate. As the hot ingot travels in such odd pass through the vertical rolls and horizontal rolls, it will pass adjacent hot metal detectors #1, #2, #3, #4 and #5 in that order to energize and/or deenergize the same, the latter signalling the positions, and hence passage, of the hot ingot to the automatic control apparatus. The automatic control apparatus senses the completion of this first odd pass when hot metal detectors #1, #2, #3 and #4 are energized (i.e., detect the hot ingot) and deenergized (i.e., do not detect the hot ingot) in that order, and will then command the next programmed even pass. At the beginning of the even pass, the horizontal and vertical roll drives will position to the programmed openings and then the horizontal and vertical rolls and the roller lines will run in reverse at the programmed rate. As the hot ingot travels in such even pass through the horizontal rolls and vertical rolls, it will pass adjacent hot metal detectors #5, #4, #3, #2 and #1 in that order to energize and/or deenergize the same, the latter signalling the positions, and hence passage, of the hot ingot to the automatic control apparatus. The automatic control apparatus senses the completion of the even pass when hot metal detectors #5, #4 and #3 are energized and deenergized in that order, and will then command the next programmed odd pass. This sequence continues until the ingot is rolled down to the desired slab size. On the last odd pass, generally, only the vertical rolls are positioned, so as to "edge" the slab, no draft on the slab being taken by the horizontal rolls, and the slab is transferred to the mill runout table, thence to the scarfer approach table, thence through the scarfer machine, and thence to the scarfer delivery table.

As mentioned above, the end of an odd pass is signalled to the automatic control apparatus by the deenergization of hot metal detector #4. Note particularly the location of hot metal detector #4 in relation to the centerline of the horizontal rolls. Physical limitations prevent the placement of hot metal detector #4 any closer to the centerline of the horizontal rolls. The angle of "vision" of this hot metal detector is therefore quite wide, and this detector will supply an inaccurate indication of ingot position relative to the horizontal rolls. This causes the ingot to pass out from and beyond the horizontal rolls further than necessary on odd passes; also, the ingot has a greater than necessary distance to travel to return to and enter the horizontal rolls on even passes.

Moreover, on the odd pass, hot metal detector #4 when energized is supposed to signal to the automatic control apparatus that the ingot has entered the horizontal rolls, in response to which signal the length of the ingot is counted out. Then, towards the end of the next even pass, the automatic control apparatus will decelerate the mill in anticipation of the end of the ingot passing therethrough. The inaccurate signal from hot metal detector #4 obviously adversely affects the accuracy of the counting out operation and the timing of the deceleration towards the end of the next even pass, and therefore may cause the ingot to "shoot" out beyond the mill a greater than necessary distance, with a greater than necessary distance for the ingot to travel to return to and enter the horizontal rolls on even passes.

Although the end of the even pass is not signalled by hot metal detector #4, but rather by hot metal detector #3, yet the above-mentioned physical limitations to the placement of hot metal detector #4 relative to the horizontal rolls, with the resulting inaccurate signal to the automatic control apparatus of ingot position relative to the horizontal rolls, is of considerable importance in the even pass as in the odd pass. Specifically, such inaccuracy in signalling to the automatic control apparatus of ingot position relative to the horizontal rolls may result in an inaccurate counting out of ingot length on the even pass, with a consequent incorrect timing of deceleration of the mill towards the end of the next odd pass.

It is apparent from the foregoing that the inaccurate signal of hot metal detector #4 on both odd and even passes increases the overall rolling time for the ingot.

A further word regarding conventional apparatus is in order at this point of the specification.

Each roll of the horizontal rolls is rotated by its own D.C. motor. Each motor is provided with a conventional commutating field winding in series with the armature winding for a commonly known purpose (i.e., to prevent arcing at the commutator segments on the armature shaft by reducing the effect of armature reaction). The armature current, and hence the current in the commutating field winding, varies with the motor torque. With no ingot in the rolls, the torque required to rotate each roll is relatively small, and the armature current and commutating field current are also relatively small. When an ingot enters the rolls, additional torque is required to maintain the speed of the rolls, and the generator through a voltage regulator control automatically increases the armature current to each motor, and hence increases the commutating field current, to supply this additional torque. Conversely, when an ingot leaves the rolls, less torque is required to maintain each roll rotating at the same speed as when the ingot was in the rolls, and the generator through the voltage regulator control automatically reduces the armature current, and hence the commutating field current, to reduce the torque. Such variations in current in the armature and commutating field winding may be detected as variations in voltage drop across the commutating field winding.

Conventionally, each of the above-mentioned D.C. motors is powered by its own D.C. generator, the speed and direction of the motor being determined by the output and polarity (direction of current) of the generator, as well as by the field resistance of the motor. The output and polarity of the generator may be adjusted by regulation of the field strength and field polarity thereof. At the start of a pass, before the ingot has entered the horizontal rolls, the motors are accelerated as rapidly as possible by increasing the generator output from 0 volts to rated voltage (which may, for example, be 750 volts) as rapidly as possible, thereby to supply the motor armatures with a large current. As the motors accelerate, a counter voltage ("back E.M.F.") is built up in the armature of each motor tending to oppose the current supplied thereto by its respective generator. At the end of a pass, after being decelerated, the motors are reversed in direction of rotation and accelerated in the reversed direction as rapidly as possible by decreasing the generator voltage to 0 volt and then increasing the generator voltage to rated voltage with opposite polarity as rapidly as possible, thereby to supply the motor armatures with a large current in the opposite direction. Again, as the motors accelerate, a back E.M.F. is built up in the armature of each motor tending to oppose the current supplied thereto by its respective generator.

It is apparent that the motor armature current, and hence the voltage drop across the commutating field winding, will vary depending upon the presence or absence of an ingot in the rolls and depending upon whether or not the motor is being accelerated or decelerated. It is also apparent that electrical circuitry, to accurately detect and signal the presence or absence of an ingot in the rolls as reflected in variations in armature current and hence in the voltage drop across the commutating field winding, must discriminate or distinguish between such variations and other variations in armature current and hence in voltage drop across the commutating field winding arising from changes in motor speed during the rolling operation.

The present circuitry replaces hot metal detector #4 in the slabbing mill of FIGURE 1, discriminates or distinguishes between variations in voltage drop across the commutating field winding arising from the presence or absence of an ingot in the horizontal rolls and variations in voltage drop across the commutating field winding arising from changes in motor speed during the rolling operation, and provides a more accurate signal to the automatic control apparatus of the position of the ingot relative to the horizontal rolls. By preventing the ingot from passing further than necessary out from and beyond the horizontal rolls, the present circuitry decreases the overall rolling time for each ingot.

Figure 5:
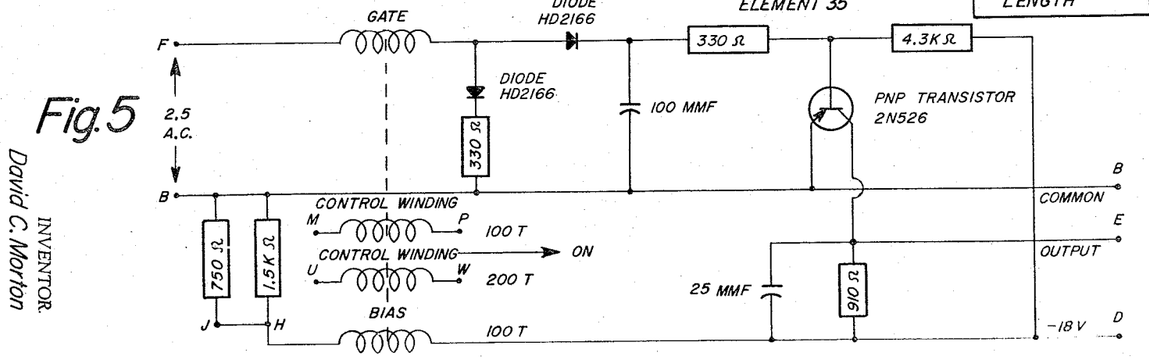
FIGURE 5 represents schematically a conventional logic "isolated input" unit, one of the components employed in the preferred embodiment of the present invention.

One embodiment of the present circuitry is shown in FIGURE 2. Full wave rectifier 1 is in series with the commutating field winding of the motor driving one of the horizontal rolls, through lines 2 and 3 and 500 ohm resistor 4. The voltage drop that appears across the commutating field winding of the motor is filtered through choke 5 and is fed to one of the control windings of conventional logic "isolated input" unit 6 through lines 7 and 8. In the preferred embodiment, logic "isolated input" unit 6 is of the type manufactured and sold by General Electric Co. under their Catalog No. 1C3500319A1. The circuit diagram for logic "isolated input" unit 6, as taken from General Electric Co. specification sheet 138A3798-112, is shown in FIGURE 5, the identification of the elements thereof as shown therein being self evident and understood by those familiar with this art. The operation of this logic "isolated input" unit 6 is best described for the purpose of this specification by reproducing herein part of the text of the above mentioned General Electric Co. specification sheet:

"Principle of operation—The isolated input unit is used to control static switching units which cannot be connected directly to a high voltage circuit. The control windings are insulated for 750 volts. Consider the circuit diagram for this unit (Note: see FIGURE 5 of this specification). Let the signals applied to the control windings be initially zero. Current flow from the −18 volt bus through the bias winding drives the reactor core into negative saturation. Under this condition with terminal "F" positive the half cycle energy from the 2.5 volt A.C. supply is absorbed in driving the reactor toward positive saturation. Thus, current flow from the A.C. supply is negligible. When terminal "F" is negative, the reactor is driven toward negative saturation. However, the diodes block current flow from the 2.5 volt source. At this time current flow from the −18 volt bus through the 4.3K resistor provides a positive bias to the transistor. Thus, the transistor is saturated and the output at terminal "E" is zero. When sufficient ampere-turns are applied to the control windings, less energy is absorbed by the reactor core during the half cycle when terminal "F" is positive. Current then flows through a diode and a 330 ohm resistor to the base of the transistor. When the balance of current flow from the A.C. supply and the −18 volt bus drives the base of the transistor positive, the transistor cuts off. The output at terminal "E" is then −18 volts. The 100 mmf. condenser charges during the conducting half cycle and provides a negative bias to the transistor during the non-conducting half cycle."

In other words, logic "isolated input" unit 6 functions, broadly speaking, as a type of sharply reacting static switch means, and contains a conventional saturable reactor, abruptly dropping or changing its output from 0 volts to −18 volts when the input signal through one of the control windings rises above a predetermined value. In the specific embodiment disclosed, logic "isolated input" unit 6 is set to abruptly change output from 0 volts to −18 volts when the signal fed to one of the control windings corresponds to an armature current in the motor greater than no-load value. Thus, with no ingot in the horizontal rolls, the output will be 0 volts; when an ingot enters the horizontal rolls, the output abruptly changes from 0 volt to −18 volts; when the ingot leaves the horizontal rolls, the output abruptly changes from −18 volts to 0 volt.

The terminals or bus bars of the D.C. generator powering the above-mentioned horizontal-roll-driving motor are connected, through lines 9a and 9b to a full wave rectifier 9c, shown only schematically, it being understood that various resistors and chokes may be required as specifically shown for full wave rectifier 1. The output of full wave rectifier 9c is connected through lines 9 and 10 and 3000 ohm resistor 11, with one of the control windings of conventional logic "isolated input" unit 12, the latter, like logic "isolated input" unit 6, preferably being of the type manufactured and sold by General Electric Co. under their Catalog No. 1C3500319A1. The circuit diagram for logic "isolated input" unit 12 is shown in FIGURE 5.

Logic "isolated input" unit 12 functions, broadly speaking, as a type of sharply reacting static switch means, containing a conventional saturable reactor, and abruptly dropping or changing its output from 0 volts to −18 volts when the input signal through one of the control windings rises above a predetermined value. In the specific embodiment disclosed, logic "isolated input" unit 12 is set to abruptly change output from 0 volts to −18 volts when the signal fed to one of the control windings corresponds to a generator output of 250 volts, the reason therefor appearing further on in this specification. Thus, with a generator output of less than 250 volts, the output will be 0 volts; when the generator output reaches 250 volts, the output abruptly changes from 0 volts to −18 volts; when the generator output drops below 250 volts, the output abruptly changes from −18 volts to 0 volts.

Figures 6, 7, 8:
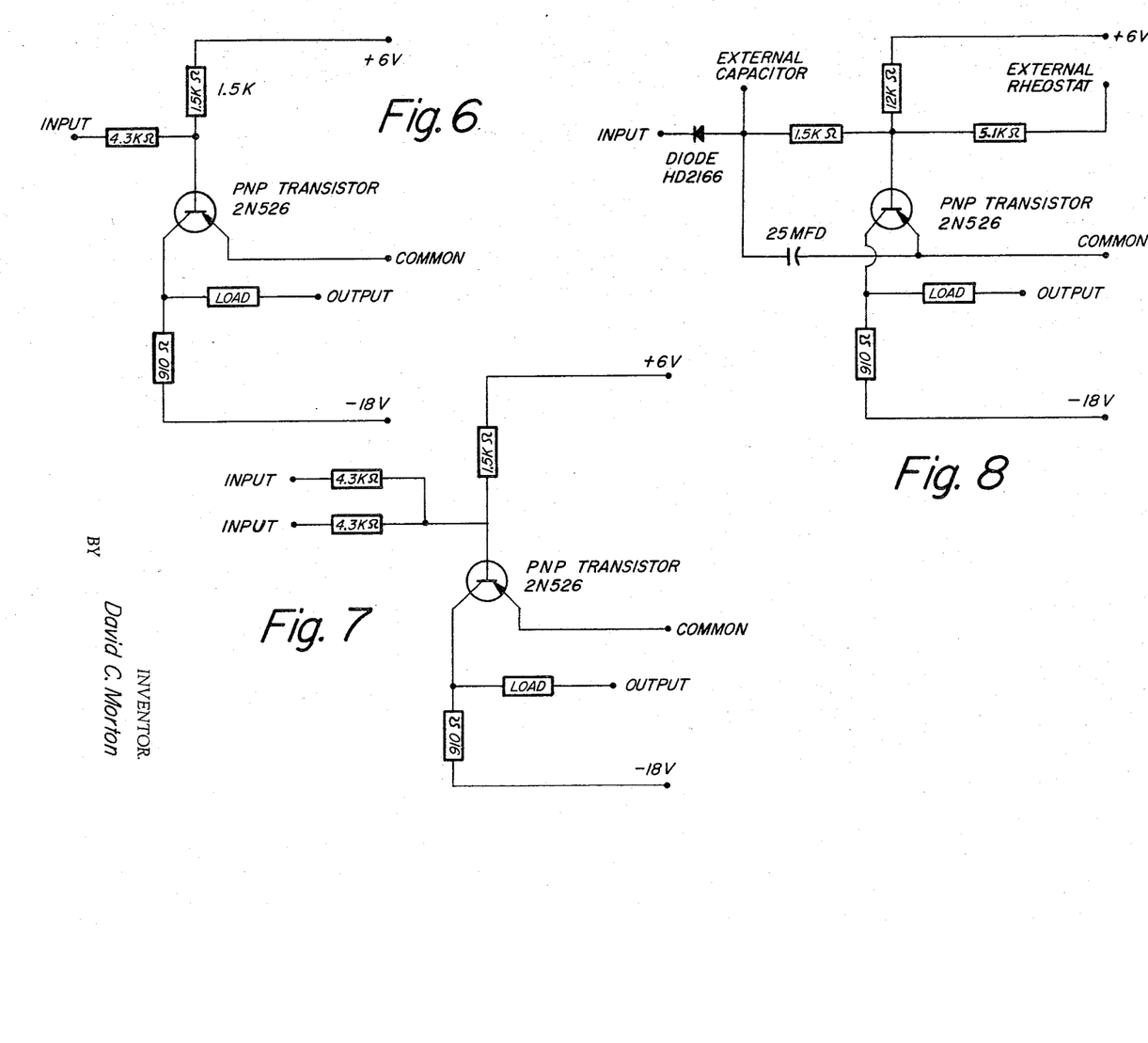
FIGURE 6 represents schematically one type of conventional logic "inverting" element, one of the components employed in the preferred embodiment of the present invention.
FIGURE 7 represents schematically one type of conventional logic "inverting and" element, one of the components employed in the preferred embodiment of the present invention.
FIGURE 8 represents schematically a conventional logic "inverting time delay" element, one of the components employed in the preferred embodiment of the present invention.

Logic "isolated input" unit 6, with an output of either 0 volts or −18 volts, communicates through line 13 with a conventional logic "inverting" element 14, the basic circuit diagram of the latter being shown in FIGURE 6. Logic "inverting" element 14 is capable of two states of stable operation, changing from one state to the other in response to the correct signal. Neglecting the effect of input signals, the +6 volt bus positively biases the base of the PNP transistor, thus supplying a negative bias to the emitter. In this state, the transistor is cut off; i.e., the impedance across the emitter-to-collector terminals of the transistor is very high compared to the output circuit resistance. Therefore, the output as measured between the output terminal and the common bus will be practically −18 volts, not correcting for output load. Now, if a −6 to −18 volt signal is applied to the input terminal, current will flow from the +6 v. bus through the 1.5K ohm resistor and the 4.3K ohm resistor to the input terminal. In this state, the base of the transistor is negatively biased, and thus the emitter is supplied with a positive bias; the impedance across the emitter-to-collector terminals of the transistor is now very low compared to the output circuit resistance, and the output voltage rises practically to 0 volts. Thus, an input signal strong enough to drive the base of the transistor negative will short out or remove the output signal. In summary, logic "inverting" element 14 produces, practically, a 0 volt output in response to a −6 to −18 volt input, which output changes abruptly to −18 volts in response to the input rising above −6 volts to 0 volts.

Logic "isolated input" unit 12, with an output of either 0 volts or −18 volts, communicates through lines 15 and 16 with a conventional logic "inverting" element 17 similar to logic "inverting" element 14.

The outputs of logic "inverting" elements 14 and 17 are fed through lines 18 and 19 respectively to the several inputs of conventional logic "inverting and" element 20, the basic circuit diagram of the latter being shown in FIGURE 7. Logic "inverting and" element 20 is capable of two states of stable operation, changing from one state to the other in response to the correct combination of signals, and is generally similar in operation to logic "inverting" element 14, except that there are several inputs rather than one. It is apparent that if all the inputs are at 0 volts, the base of the transistor will be positively biased, thus supplying a negative bias to the emitter. In this state, the transistor is cut off (i.e., has a very high impedance across the emitter-to-collector terminals relative to the resistance of the output circuit) and the output will be practically −18 volts, not correcting for output load. If any or all the inputs are −6 to −18 volts, the base of the transistor will be negatively biased, the impedance across the emitter-to-collector terminals will be very low relative to the output circuit resistance, and in this state the output will be practically 0 volts. Thus, any input signal strong enough to drive the base of the transistor negative will short out or remove the output signal. In summary, logic "inverting and" element 20 produces, practically, a −18 volt signal only when all inputs have risen above −6 volts to 0 volts, which output changes abruptly to 0 volts when any or all of the inputs change to −6 to −18 volts.

The output of logic "inverting and" element 20 is fed through line 21 to the input of logic "inverting" element 22, the latter being similar to logic "inverting" element 14.

Line 23 communicates between line 15 of logic "isolated input" unit 12 and the input of logic "inverting" element 24, the latter being similar to logic "inverting" element 14.

The output of logic "inverting" element 24 is fed through line 25 to one of the several inputs of logic "inverting and" element 26, the latter being similar to logic "inverting and" element 20. The conventional automatic control apparatus heretofore described provides a 0 volt signal when the rolling mill is decelerating or stopped, and a −18 volt signal at other times. This signal is fed through line 27 to logic "inverting" element 28, the latter being similar to logic "inverting" element 14. The output of logic "inverting" element 28 is fed through line 29 to another input of logic "inverting and" element 26.

The output of logic "inverting and" element 26 is fed through line 30 to logic "inverting" element 31, the latter being similar to logic "inverting" element 14.

The output of logic "inverting" element 31 is fed through line 32 to conventional logic "inverting time delay" element 33, the basic circuit diagram of the latter being shown in FIGURE 8. Logic "inverting time delay" element 33 is capable of two states of stable operation, changing from one state to the other at a predetermined interval of time after a change in input signal, and is generally similar in operation to logic "inverting" element 14, except that a condenser is placed in a line between the input and the common bus. It is apparent that if the input is 0 volts, the base of the transistor will be positively biased, thus supplying a negative bias to the emitter. In this state, the transistor is cut off (i.e., has a very high impedance across the emitter-to-collector terminals relative to the resistance of the output circuit) and the output will be practically −18 volts, not correcting for output load. Now, a −6 to −18 volt signal applied to the input terminal will remove the positive bias from the base of the transistor. In this state, the base of the transistor is negatively biased relative to the emitter, the impedance across the emitter-to-collector terminals of the transistor is now very low compared to the output circuit resistance, and the output voltage rises practically to 0 volts. In reverting to the first state, after the input signal rises above −6 volts to 0 volts, the condenser commences to discharge through the 1.5K ohm resistor and the emitter circuit of the transistor. After an interval of time, the transistor is again cut off and the output falls to practically −18 volts; thus a change in input signal strong enough to drive the base of the transistor positive will, an interval of time after the change, produce the −18 volt output signal. In summary, logic "inverting time delay" element 33 produces an output signal which abruptly changes from −18 volts to 0 volts when the input signal drops from 0 volts to below −6 volts to −18 volts; moreover, the output signal, an interval of time after the input signal rises above −6 volts to 0 volts, abruptly changes from 0 volts to practically −18 volts. The time interval can be adjusted by using external capacitance and an external rheostat where indicated in FIGURE 8. The time interval is chosen so that at the end thereof the motor will have reached its rated speed, at which time the back E.M.F. built up in the motor armature will have reduced the armature current from its acceleration value to its no-load value. In the actual embodiment of the apparatus described herein, the motor will have reached its rated speed substantially at the same time that the generator has reached its rated output. Thus, the time interval may be chosen so as to be the same as the time interval required to bring the output of the generator powering the horizontal-roll-driving motor from 0 volts to its rated output. Practically, because logic "isolated input" unit 12 changes output from 0 volts to −18 volts when the input rises to 250 volts and vice versa, the time interval for logic "inverting time delay" element 33 is chosen to be substantially the same as the time interval required to bring the output of the generator from 250 volts to its rated output; in the actual embodiment of the present invention, the generator rated output is 750 volts and the time interval is approximately 1.5 seconds. It is apparent that, if logic "isolated input" unit 12 is set to change output signals at input voltages higher than 250 volts, the time interval can be less than approximately 1.5 seconds. (If the input voltage to logic "isolated input" unit 12 determinative of the output signal thereof is set to 750 volts, the rated output of the generator, or to a voltage substantially equal thereto, the time interval may be 0 seconds or subsantially equal thereto, in which instance it may be possible to dispense with logic "inverting time delay" element 33; line 32 would then lead directly through line 37 to one of the inputs of logic "inverting and" element 38.)

The output of logic "inverting time delay" element 33 is fed through line 34 to the input of logic "inverting" element 35, the latter being similar to logic "inverting" element 14.

The outputs of logic "inverting" elements 22 and 35 are fed through lines 36 and 37 respectively to the inputs of logic "inverting and" element 38, the latter being similar to logic "inverting and" element 20. The output of logic "inverting and" element 38 is fed through line 39 to the automatic control apparatus. When the output of logic "inverting and" element 38 is, practically, −18 volts, the automatic control apparatus is being signalled that the ingot is in the horizontal rolls; when this output is 0 volts, the automatic control apparatus is being signalled that the ingot is out of the horizontal rolls. As previously noted at column 3, the automatic control apparatus performs several functions, and these are indicated in block form in FIGURE 2, that function relating to the control of the horizontal roll motor being separated from the other functions for clarity, and two lines are shown leading from the horizontal roll motor control function and are indicated as connecting to the horizontal generator, whereby control of the voltage and polarity of the output of the horizontal generator by conventional means will control the speed and direction of the horizontal roll motor.

In the operation of the circuitry of FIGURE 2, which is best illustrated by Table I, the effect of the output circuit impedance of the several logic elements on their respective output signals will be ignored and it will, for the purpose of clarity, be assumed that each of the several logic elements produces an output signal of either 0 volts or −18 volts. It will be further assumed that the slabbing mill of FIGURE 1 is being operated by the conventional automatic control apparatus.

By reference to Table I, it is an easy matter to trace the signals of the several logic elements from the horizontal-roll-driving motor and the generator powering the same to the conventional automatic control apparatus operating the mill. The conditions referred to alphabetically in Table I are the following:

Condition A:
   (1) Ingot is present in horizontal rolls, *and*
   (2) Generator output is 0 volts or less than 250 volts.

Condition B:
   (1) Ingot is present in horizontal rolls, *and*
   (2) Generator output is 250 volts or more, *and*
   (3) Generator output has been 250 volts or more for less than 1.5 seconds.

Condition C:
   (1) Ingot is present in horizontal rolls, *and*
   (2) Generator output is 250 volts or more, *and*
   (3) Generator output has been at least 250 volts for at least 1.5 seconds.

Condition D:
   (1) Ingot is absent from horizontal rolls, *and*
   (2) Generator output is 0 volts or less than 250 volts.

Condition E:
   (1) Ingot is absent from horizontal rolls, *and*
   (2) Generator output is 250 volts or more, *and*
   (3) Generator output has been at least 250 volts for at least 1.5 seconds.

Condition F:
   (1) Ingot is absent from horizontal rolls, *and*
   (2) Generator output is 250 volts or more, *and*
   (3) Generator output has been 250 volts or more for less than 1.5 seconds and motor is accelerating.

Condition G:
   (1) Ingot is absent from horizontal rolls, *and*
   (2) Motor is decelerating but generator output has not dropped below 250 volts.

TABLE I

| Condition | Volts | | | | | | |
|---|---|---|---|---|---|---|---|
| | A | B | C | D | E | F | G |
| Output of logic "isolated input" unit 6 | −18 | −18 | −18 | 0 | 0 | −18 | −18 |
| Output of logic "inverting" element 14 | 0 | 0 | 0 | −18 | −18 | 0 | 0 |
| Output of logic "isolated input" unit 12 | 0 | −18 | −18 | 0 | −18 | −18 | −18 |
| Output of logic "inverting" element 17 | −18 | 0 | 0 | −18 | 0 | 0 | 0 |
| Output of logic "inverting and" element 20 | 0 | −18 | −18 | 0 | 0 | −18 | −18 |
| Output of logic "inverting" element 22 | −18 | 0 | 0 | −18 | −18 | 0 | 0 |
| Output of logic "inverting" element 24 | −18 | 0 | 0 | −18 | −18 | 0 | 0 |
| Output of logic "inverting" element 28 | 0 | 0 | 0 | 0 | 0 | 0 | −18 |
| Output of logic "inverting and" element 26 | 0 | −18 | −18 | 0 | 0 | 0 | −18 |
| Output of logic "inverting" element 31 | −18 | 0 | 0 | −18 | −18 | −18 | 0 |
| Output of logic "inverting time" delay element 33 | 0 | 0 | −18 | 0 | −18 | 0 | −18 |
| Output of logic "inverting" element 35 | −18 | −18 | 0 | −18 | 0 | −18 | 0 |
| Output of logic "inverting and" element 38 and signal to automatic control apparatus | 0 | 0 | −18 | 0 | 0 | 0 | 0 |

Table I clearly indicates that the automatic control apparatus receives a −18 volt signal indicative of the unequivocal presence of the ingot in the horizontal rolls only for condition C and for no other condition. Also, Table I indicates that the automatic control apparatus receives a 0 volt signal indicative of the absence of the ingot from the horizontal rolls for conditions D, E and F representing the several possible combinations of ingot absence, generator voltage and time. Conditions A and B, when they obtain, are transitory only, and may generally be said to represent the time required for the generator to reach its rated output of 750 volts in the typical slabbing mill of FIGURE 1; for the generator therewith employed and under chosen operating conditions this time interval is of the order of 1.5 seconds or so from start (0 volts) and is only slightly less (still approximately 1.5 seconds) from 250 volts.

As hereinbefore mentioned, the conventional automatic control apparatus produces a −18 volt signal when an odd or even pass is in operation, when the mill is to be reversed, it must, of course, be stopped between passes; this is controlled by the conventional automatic control apparatus which produces a 0 volt signal, the latter, passing through a conventional panel board and conventional controls, reducing the generator output from its rated voltage to 0 volts, thereby reducing the applied armature voltage (to the motor) to 0 volts, causing the motor to decelerate and stop. The ingot, of course, is out of the horizontal rolls at this point and would not cause the armature current to be above the no-load level. Until the motor actually stops, the back E.M.F. in the armature thereof is no longer opposed by the full applied armature voltage (approximately 735 volts back E.M.F. vs. approximately 750 volts applied armature voltage during a pass in the actual embodiment of the present invention); the reduction in back E.M.F. lags behind the reduction in applied armature voltage and consequently, the armature current rises above its no-load value during deceleration, causing logic "isolated input" unit 6 to produce an output signal indicative of armature current above no-load level which, unless blocked, would be spurious insofar as concerns the position of the ingot. Logic "isolated input" unit 12 cannot relate such increase in armature current above no-load level with deceleration of the motor, so as to signal to block the spurious signal of logic "isolated input" unit 6 until the generator voltage drops below 250 volts the input signal to logic "isolated input" unit 12 determinative of the output thereof. However the signal from the conventional automatic control apparatus has changed from −18 volts to 0 volts to initiate such deceleration. Consequently as shown in the several tables under condition G this signal from the automatic control apparatus blocks the spurious signal from logic "isolated input" unit 6. If the input voltage to logic "isolated input" unit 12 determinative of the output thereof was the rated output of the generator, 750 volts in the actual embodiment of the present invention, then logic "isolated input" unit 12 would itself be capable of blocking a spurious signal from logic "isolated input" unit 6 during deceleration of the horizontal-roll-driving motor.

In the actual embodiment of the present invention, it is preferred not to set the input voltage of logic "isolated input" unit 12 determinative of the output thereof at 750 volts because this could introduce too great a delay between passes at the end of the rolling operation (250 volts being chosen as just sufficient to permit logic "inverting time delay" element 33 to reset, as hereinafter explained); moreover, there are times when the generator is operated not at rated output but at some lower value, as 500 volts.

As hereinbefore described, logic "inverting time delay" element 33, by its very nature, does not react instantaneously to a change in input signal from −18 volts to 0 volts, but rather passes abruptly from one stable state to the other stable state a definite and predetermined interval of time after the said change an input signal. After the last even pass in the slabbing mill shown in FIGURE 1, the draft of the horizontal rolls may not require any resetting, the next and last odd pass not performing any further change or reduction in the cross-section of the slab by means of the horizontal rolls. Thus, the drives for the horizontal roll openings are not actuated by the automatic control apparatus, and the interval of time between the last even pass and the next and last odd pass is very short and may be smaller than the reaction time of logic "inverting time delay" element 33. This means that the signal from the automatic control apparatus passes so quickly from −18 volts (indicating the even pass is in operation) to 0 volts (indicating the mill has stopped between passes) and back to −18 volts (indicating the odd pass is in operation) that logic "inverting time delay" element 33 cannot "reset," i.e., the capacitor of logic "inverting time delay" element 33 cannot discharge sufficiently to change the bias of the base of the transistor; in effect, then, logic "inverting time delay" element 33 would not be able to detect the end of the even pass. It is apparent that this would result in an incorrect signal to the automatic control apparatus of the position of the slab. To prevent this, and to insure that the logic "inverting time delay" element 33 will reset, logic elements 24, 26 and 31 are employed to communicate signals to logic "inverting time delay" element 33 indicative of the output of logic "isolated input" element 12 and hence, broadly speaking, of the output of the generator powering the horizontal-roll-driving motor. Thus, the response and output of logic "inverting time delay" element 33 is a function, broadly speaking, of the signal from the automatic control apparatus as well as the generator voltage. Now, when the slabbing mill operation progresses from any one pass to the next pass, and specifically from the last even pass to the next and last odd pass, the direction of rotation of the horizontal-roll-driving motor must reverse, and therefore the polarity of the generator powering the horizontal-roll-driving motor must also reverse to change the direction of rotation of the motor. In other words, where the generator has a rated output of 750 volts, the output thereof in the foregoing instance must change from +750 volts to 0 volts to −750 volts (or from −750 volts to 0 volts to +750 volts). Logic "isolated input" unit 12 is adjusted or set to change its output from 0 volts to −18 volts, and vice versa, in response to a voltage input at such level that the time interval required for the generator to change polarity at this voltage level, passing of course through the 0 volt level, is sufficient for the logic "inverting time delay" element 33 to reset; specifically, the time interval required for the generator to change polarity at the voltage level chosen to actuate logic "isolated input" unit 12 may be the same as, or perhaps slightly greater than, the time interval required for the resetting of logic "inverting time delay" element 33. In and for the particular circuitry and apparatus herein described, the voltage level of the generator chosen to actuate logic "isolated input" unit 12, as hereinbefore mentioned, is 250 volts. The interval of time required for the generator output to change form +250 volts to 0 volts to −250 volts (or −250 volts to 0 volts to +250 volts) is sufficient to permit the capacitor of logic "inverting time delay" element 33 to discharge sufficiently to change the bias of the base of the transistor; i.e., logic "inverting time delay" element 33 can reset itself in the interval of time required for the generator output to change polarity at the 250 volt level. It is apparent that logic "inverting time delay" element 33 must reset between the last even pass and the next and last odd pass because of the change of signal from logic elements 26 and 31, and logic "inverting and" element 26 must signal logic "inverting time delay" element 33 to reset because the generator must actuate logic "isolated input" unit 12 in changing polarity.

In effect, therefore, logic elements 12, 24, 26 and 31 function to provide sufficient time for logic "inverting time delay" element 33 to reset, where sufficient time is not provided by the automatic control apparatus in its signal to logic "inverting" element 28.

Figure 3:
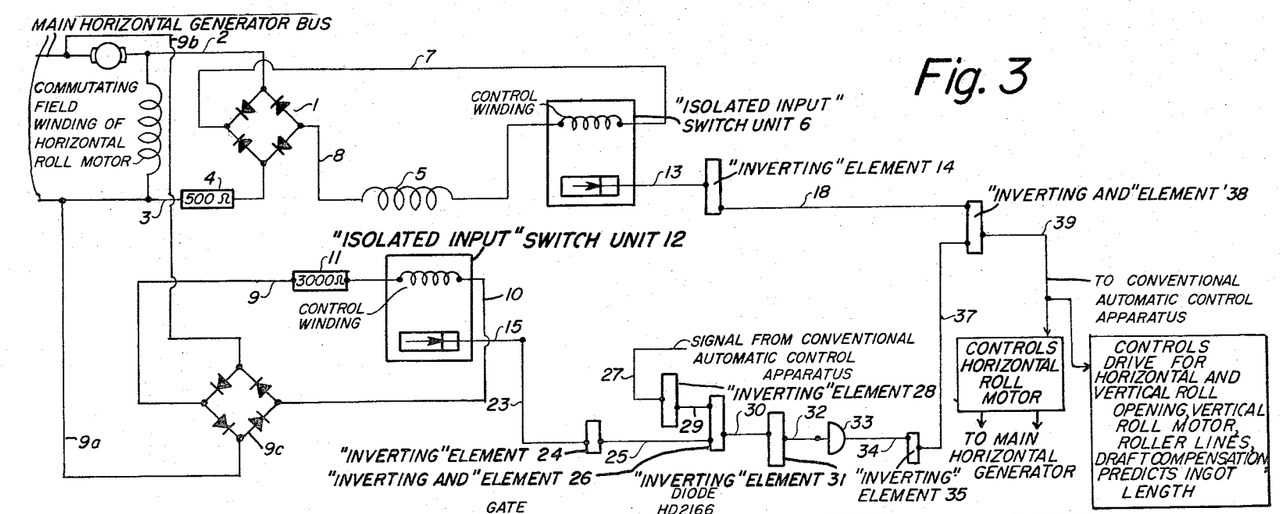
FIGURE 3 represents schematically a modification of the electrical circuitry comprising the present invention.

A modification of the circuitry of the present invention is shown in FIGURE 3. Those items of FIGURE 2 designated by the numerals 16, 17, 19, 20, 21, 22 and 36 have been eliminated from the circuitry of FIGURE 3, the output of logic "inverting" element 14 now being fed directly to logic "inverting and" element 38 through line 18. The operation of the circuitry of FIGURE 3 may easily be followed by reference to Table II which permits the reader to trace the signals of the several logic elements from the horizontal-roll-driving motor and the generator powering the same to the conventional automatic control apparatus operating the mill. The conditions referred to alphabetically in Table II are the same as those defined for Table I.

Logic "inverting" elements and logic "inverting and" elements as herein used and shown in FIGURES 6 and 7 are obtainable in units of assemblies of several such logic elements from General Electric Co. under their Catalog No. 1C3500A304A1, and may also be obtained, with slight modifications in the basic circuitry, in units or assemblies of several elements, from General Electric Co. under their Catalog No. 1C3500A303A1. Logic "inverting time delay" elements as herein used and shown in FIGURE 8 are obtainable in units or assemblies of several such logic elements from General Electric Co. under their Catalog No. 1C3500311A1, and may also be obtained, with slight modifications in the basic circuitry, in units or assemblies of several such logic elements, from General Electric Co. under Catalog No. 1C3500A310A1.

I do not wish to be limited to the exact construction and operation of my invention as shown in some detail in the several embodiments herein, but may use such

TABLE II

| Condition | Volts | | | | | | |
|---|---|---|---|---|---|---|---|
| | A | B | C | D | E | F | G |
| Output of logic "isolated input" unit 6 | −18 | −18 | −18 | 0 | 0 | −18 | −18 |
| Output of logic "inverting" element 14 | 0 | 0 | 0 | −18 | −18 | 0 | 0 |
| Output of logic "isolated input" unit 12 | 0 | −18 | −18 | 0 | −18 | −18 | −18 |
| Output of logic "inverting" element 24 | −18 | 0 | 0 | −18 | 0 | 0 | 0 |
| Output of logic "inverting" element 28 | 0 | 0 | 0 | 0 | 0 | 0 | −18 |
| Output of logic "inverting and" element 26 | 0 | −18 | −18 | 0 | −18 | −18 | 0 |
| Output of logic "inverting" element 31 | −18 | 0 | 0 | −18 | 0 | 0 | −18 |
| Output of logic "inverting time delay" element 33 | 0 | 0 | −18 | 0 | −18 | 0 | 0 |
| Output of logic "inverting" element 35 | −18 | −18 | 0 | −18 | 0 | −18 | −18 |
| Output of logic "inverting and" element 38 and signal to automatic control apparatus | 0 | 0 | −18 | 0 | 0 | 0 | 0 |

TABLE III

| Condition | Volts | | | | | | |
|---|---|---|---|---|---|---|---|
| | A | B | C | D | E | F | G |
| Output of logic "isolated input" element 6 | −18 | −18 | −18 | 0 | 0 | −18 | −18 |
| Output of logic "inverting" element 14 | 0 | 0 | 0 | −18 | −18 | 0 | 0 |
| Output of logic "isolated input" unit 12 | 0 | −18 | −18 | 0 | −18 | −18 | −18 |
| Output of logic "inverting" element 24 | −18 | 0 | 0 | −18 | 0 | 0 | 0 |
| Output of logic "inverting and" element 20 | 0 | −18 | −18 | 0 | 0 | −18 | −18 |
| Output of logic "inverting" element 22 | −18 | 0 | 0 | −18 | −18 | 0 | 0 |
| Output of logic "inverting" element 28 | 0 | 0 | 0 | 0 | 0 | 0 | −18 |
| Output of logic "inverting and" element 26 | 0 | −18 | −18 | 0 | −18 | −18 | 0 |
| Output of logic "inverting" element 31 | −18 | 0 | 0 | −18 | 0 | 0 | −18 |
| Output of logic "inverting time delay" element 33 | 0 | 0 | −18 | 0 | −18 | 0 | 0 |
| Output of logic "inverting" element 35 | −18 | −18 | 0 | −18 | 0 | −18 | −18 |
| Output of logic "inverting and" element 38 and signal to automatic control apparatus | 0 | 0 | −18 | 0 | 0 | 0 | 0 |

The signals transmitted to the automatic control apparatus for conditions A–F in the circuitry of FIGURE 3, as indicated in Table II, are the same for these conditions as in Table I.

Figure 4:
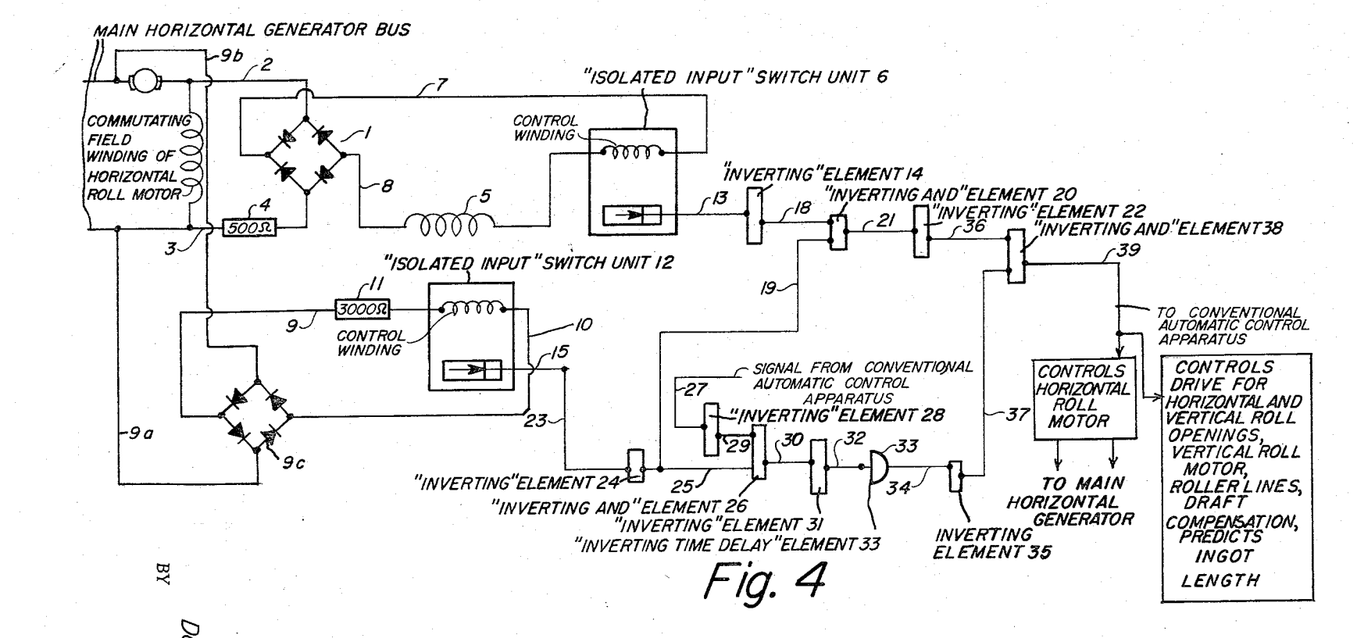
FIGURE 4 represents schematically still another modification of the electrical circuitry comprising the present invention.

Still another modification of the circuitry of the present invention is shown in FIGURE 4. Those items of FIGURE 2 designated by the numerals 16 and 17 have been eliminated from the circuitry of FIGURE 4, line 19 communicating with one of the inputs of logic "inverting and" element 20 now being tied in with line 25 and therefore to the output of logic "inverting" element 24. The operation of the circuitry of FIGURE 4 may easily be followed by reference to Table III which permits tracing the signals of the several logic elements from the horizontal-roll-driving motor and the generator powering the same to the conventional automatic control apparatus operating the mill. The conditions referred to alphabetically in Table III are the same as those defined for Table I.

The signals transmitted to the automatic control apparatus for conditions A–F in the circuitry of FIGURE 4, as indicated in Table III, are the same for these conditions as in Table I.

substitutions, modifications or equivalents thereof as are embraced within the scope of my invention or as pointed out in the claims.

I claim:
1. Electrical circuitry for detecting and signalling the presence or absence of a mechanical load on an electric motor powered from an electrical source of power having output terminals with an output voltage across said output terminals adjustable between 0 volts and a rated voltage, comprising:
   (a) first means electrically associated with the armature of said motor and responsive to the armature current flowing therein, said first means being adapted to emit a first output signal in response to armature currents below a predetermined value and a second output signal in response to armature current above the said predetermined value,
   (b) second means electrically associated with the output terminals of said electrical source of power and responsive to the output voltage of said electrical source of power, said second means being adapted to emit a first output signal in response to electrical source output voltages below a predetermined value and a second output signal in response to electrical source output voltages above the said predetermined value, (c) third means electrically associated with said first and second means and responsive to the output signals of said first and second means, said third means being adapted to emit a first output signal indicative of a mechanical load on said motor in response only to the combination of a second output signal from said first means and a second output signal from said second means, said third means being further adapted to emit a second output signal in response to all other combinations of output signals from said first and second means.

2. Electrical circuitry as in claim 1, further including:
(d) time delay means electrically interposed between said second means and said third means, said time delay means being adapted to delay for a predetermined interval of time the communication to said third means of a change in output signal of said second means.

3. Electrical circuitry as in claim 2, further including:
(e) said time delay means being adapted to delay communication to said third means of a change in output signal of said second means for an interval of time substantially equal to the time required for said motor to reach its rated speed.

4. Electrical circuitry as in claim 2, further including:
(e) said time delay means being adapted to delay communication to said third means of a change in output signal of said second means for an interval of time substantially equal to the time required for the output voltage of said electrical source of power to increase from 0 volts to the rated output voltage of said electrical source of power.

5. Electrical circuitry as in claim 2, further including:
(e) said time delay means being adapted to delay communication to said third means of a change in output signal of said second means for an interval of time substantially equal to the time required for the output voltage of said electrical source of power to increase from the predetermined value of output voltage of said electrical source of power determinative of the output signal of said second means to the rated output voltage of said electrical source of power.

6. Electrical circuitry as in claim 2, further including:
(e) said time delay means requiring an interval of time for reset after a change in its output signal,
(f) the time interval required for the value of the output voltage of the electrical source of power to change from the predetermined value of output voltage of said electrical source of power determinative of the output signal of said second means to 0 volts and back to said predetermined value being at least equal substantially to the interval of time for reset of said time delay means.

7. Electrical circuitry as in claim 3, further including:
(f) said time delay means requiring an interval of time for reset after a change in its output signal,
(f) the time interval required for the value of the output voltage of the electrical source of power to change from the predetermined value of output voltage of said electrical source of power determinative of the output signal of said second means to 0 volts and back to said predetermined value being at least equal substantially to the interval of time for reset of said time delay means.

8. Electrical circuitry as in claim 4, further including:
(f) said time delay means requiring an interval of time for reset after a change in its output signal,
(g) the time interval required for the value of the output voltage of the electrical source of power to change from the predetermined value of output voltage of said electrical source of power determinative of the output signal of said second means to 0 volts and back to said predetermined value being at least equal substantially to the interval of time for reset of said time delay means.

9. Electrical circuitry as in claim 5, further including:
(f) said time delay means requiring an interval of time for reset after a change in its output signal,
(g) the time interval required for the value of the output voltage of the electrical source of power to change from the predetermined value of output voltage of said electrical source of power determinative of the output signal of said second means to 0 volts and back to said predetermined value being at least equal substantially to the interval of time for reset of said time delay means.

10. Electrical circuitry for detecting and signalling the presence or absence of a mechanical load on an electric motor powered from an electrical source of power having output terminals with an output voltage across said output terminals adjustable between 0 volts and a rated voltage, which electrical source of power is controlled by a control apparatus producing a first output signal when said motor is decelerating and a second output signal at other times, said electrical circuitry comprising:

(a) first means electrically associated with the armature of said motor and responsive to the armature current flowing therein, said first means being adapted to emit a first output signal in response to armature currents below a predetermined value and a second output signal in response to armature currents above the said predetermined value, (b) second means electrically associated with the output terminals of said electrical source of power and responsive to the output voltage of said electrical source of power, said second means being adapted to emit a first output signal in response to electrical source output voltages below a predetermined value and a second output signal in response to electrical source output voltages above the said predetermined value, (c) third means electrically associated with said control apparatus and with said second means and responsive to the output signals of said control apparatus and said second means, said third means being adapted to emit a first output signal in response only to the combination of a second output signal from said control apparatus and a second output signal from said second means, said third means being further adapted to emit a second output signal in response to all other combinations of output signals from said control apparatus and said second means, (d) fourth means electrically associated with said first and third means and responsive to the output signals of said first and third means, said fourth means being adapted to emit a first output signal indicative of the presence of a mechanical load on the motor in response only to the combination of a second output signal from said first means and a first output signal from said third means, said fourth means being further adapted to emit a second output signal in response to all other combinations of output signals from said first and third means.

11. Electrical circuitry for detecting and distinguishing between a mechanical no-load condition and a mechanical load condition of a D.C. motor powered and controlled by an electrical source of D.C. power of reversible polarity having output terminals with an output voltage across said output terminals adjustable between 0 volts and a rated voltage, comprising:

(a) first static switch means electrically associated with the armature of said motor and responsive to the armature current flowing therein, said first static switch means being adapted to emit a first output signal in response to armature currents corresponding to a mechanical no-load condition of said motor and a second output signal in response to armature currents corresponding to a mechanical load condition of said motor, (b) second static switch means electrically associated with the output terminals of said electrical source of power and responsive to the output voltage of said electrical source of power, said second static switch means being adapted to emit a first output signal in response to electrical source output voltages below a predetermined value and a second output signal in response to electrical source output voltages above the said predetermined value, (c) third static switch means electrically associated with said first and second static switch means and responsive to the output signals of said first and second static switch means, said third static switch means being adapted to emit a first output signal indicative of a mechanical load condition of the motor in response only to the combination of a second output signal from said first static switch means and a second output signal from said second static switch means, said third static switch means being further adapted to emit a second output signal in response to all other combinations of output signals from said first and second static switch means, (d) time delay means electrically interposed between said second static switch means and said third static switch means, (e) said time delay means being adapted to delay communication to said third static switch means of a change in output signal of said second static switch means for an interval of time substantially equal to the time required for the output voltage of said electrical source to increase from the predetermined value of output voltage of said electrical source determinative of the output signal of said second static switch means to the rated output voltage of said electrical source, (f) said time delay means requiring an interval of time for reset after a change in its output signal, (g) the time interval required for the value of the output voltage of the electrical source to pass from the predetermined value of output voltage of said electrical source of one polarity determinative of the output signal of said second static switch means through 0 volts to said predetermined value of opposite polarity being at least equal substantially to the interval of time for reset of said time delay means.

12. Electrical circuitry for detecting and distinguishing between a mechanical no-load condition and a mechanical load condition of a reversing D.C. motor powered and controlled by an electrical source of D.C. power of reversible polarity having output terminals with an output voltage across said output terminals adjustable between 0 volts and rated voltage, comprising:

(a) first logic "isolated input" means electrically associated with the commutating field winding of said motor and responsive to the armature current flowing in said motor, said first logic "isolated input" means being adapted to emit a first output signal in response to armature currents corresponding to a mechanical no-load condition of said motor and a second output signal in response to armature currents corresponding to a mechanical load condition of said motor, (b) second logic "isolated input" means electrically associated with the output terminals of said electrical source of power and responsive to the output voltage of said electrical source of power, said second logic "isolated input" means being adapted to emit a first output signal in response to electrical source output voltages below a predetermined value and a second output signal in response to electrical source voltages above the said predetermined value, (c) first logic "inverting and" means electrically associated with said first and second logic "isolated input" means and responsive to the output signals of said first and second logic "isolated input" means, said first logic "inverting and" means being adapted to emit a first output signal indicative of a mechanical load condition of said motor in response only to the combination of a second output signal from said first logic "isolated input" means and a second output signal from said second logic "isolated input" means, said first logic "inverting and" means being further adapted to emit a second output signal in response to all other combinations of output signals from said first and second logic "isolated input" means, (d) logic "inverting time delay" means electrically interposed between said second logic "isolated input" means and said first logic "inverting and" means, (e) said logic "inverting time delay" means being adapted to delay communication to said first logic "inverting and" means of a change in output signal of said second logic "isolated input" means for an interval of time substantially equal to the time required for the output voltage of said electrical source to increase from the predetermined value of output voltage of said electrical source determinative of the output signal of said second logic "isolated input" means to the rated output voltage of said electrical source, (f) said logic "inverting time delay" means requiring an interval of time for reset after a change in its output signal, (g) the time interval required for the value of the output voltage of the electrical source to pass from the predetermined value of output voltage of said electrical source of one polarity determinative of the output signal of said several logic "isolated input" means through 0 volts to said predetermined value of opposite polarity being at least equal substantially to the interval of time for reset of said logic "inverting time delay" means.

13. Electrical circuitry for detecting and distinguishing between a mechanical no-load condition and a mechanical load condition of a reversing D.C. motor powered and controlled by an electrical source of D.C. power of reversible polarity having output terminals with an output voltage across said output terminals adjustable between 0 volts and rated voltage, comprising:

(a) first logic "isolated input" means electrically associated with the commutating field winding of said motor and responsive to the armature current flowing in said motor, said first logic "isolated input" means being adapted to emit a first output signal in response to armature currents corresponding to a mechanical no-load condition of said motor and a second output signal in response to armature currents corresponding to a mechanical load condition of said motor, (b) second logic "isolated input" means electrically associated with the output terminals of said electrical source and responsive to the output voltage of said electrical source, said second logic "isolated input" means being adapted to emit a first output signal in response to electrical source output voltages below a predetermined value and a second output signal in response to electrical source voltages above the said predetermined value, (c) first logic "inverting and" means electrically associated with said first and second logic "isolated input" means and responsive to the output signals of said first and second logic "isolated input" means, said first logic "invertnig and" means being adapted to emit a first output signal in response only to the combination of a second output signal from said first logic "isolated input" means and a second output signal from said second logic "isolated input" means, said first logic "inverting and" means being further adapted to emit a second output signal in response to all other combinations of output signals from said first and second logic "isolated input" means,
- (d) logic "inverting time delay" means electrically associated with said second logic "isolated input" means and responsive to the output signals of said second logic "isolated input" means, said logic "inverting time delay" means being adapted to emit a first output signal in response to a first output signal from said second logic "isolated input" means, and a second output signal in response to a second output signal from said second logic "isolated input" means,
- (e) second logic "inverting and" means electrically associated with said first logic "inverting and" means and said logic "inverting time delay" means and responsive to the output signals of said first logic "inverting and" means and said logic "inverting time delay" means, said second logic "inverting and" means being adapted to emit a first output signal indicative of a mechanical load condition of said motor in response only to the combination of a first output signal from said first logic "inverting and" means and a second output signal from said second logic "isolated input" means, said second logic "inverting and" means being further adapted to emit a second output signal in response to all other combinations of output signals from said first logic "inverting and" means and said logic "invertnig time delay" means,
- (f) said logic "inverting time delay" means being adapted to delay a change in its output signal in response to a change in the output signal of said second logic "isolated input" means for an interval of time substantially equal to the time required for the output voltage of said electrical source to increase from the predetermined value of output voltage of said electrical source determinative of the output signal of said second logic "isolated input" means to the rated output voltage of said electrical source,
- (g) said logic "inverting time delay" means requiring an interval of time for reset after a change in its output signal,
- (h) the time interval required for the value of the output voltage of the electrical source to pass from the predetermined value of output voltage of said electrical source of one polarity determinative of the output signal of said second logic "isolated input" means through 0 volts to said predetermined value of opposite polarity being at least equal substantially to the interval of time for reset of said logic "inverting time delay" means.

14. In association with a reversible rolling mill driven by a reversing motor powered from an electrical source of power having output terminals with an output voltage across said output terminals adjustable between 0 volts and a rated voltage, which reversible rolling mill is automatically controlled by an automatic control apparatus which is adapted to emit a first output signal when the mill is decelerating and a second output signal at other times, electrical circuitry for detecting the presence or absence of an ingot in the reversible rolling mill and signalling the presence or absence of the ingot to the automatic control apparatus, said electrical circuitry comprising:
- (a) first means electrically associated with the armature of said motor and responsive to the armature current flowing therein, said first means being adapted to emit a first output signal in response to armature currents in the motor corresponding to the absence of the ingot from the reversible rolling mill and a second output signal in response to armature currents in the motor corresponding to the presence of the ingot in the reversible rolling mill,
- (b) second means electrically associated with the output terminals of said electrical source of power and responsive to the output voltage of said electrical source of power, said second means being adapted to emit a first output signal in response to electrical source output voltages below a predetermined value and a second output signal in response to electrical source output voltages above the said predetermined value,
- (c) third means electrically associated with said automatic control apparatus and with said second means and responsive to the output signals of said automatic control apparatus and said second means, said third means being adapted to emit a first output signal in response only to the combination of a second output signal from said automatic control apparatus and a second output signal from said second means, said third means being further adapted to emit a second output signal in response to all other combinations of output signals from said automatic control apparatus and said second means,
- (d) fourth means electrically associated with said first and third means and responsive to the output signals of said first and third means, said fourth means being adapted to emit a first output signal indicative of the presence of an ingot in the reversible rolling mill in response only to the combination of a second output signal from said first means and a first output signal from said third means, said fourth means being further adapted to emit a second output signal in response to all other combinations of output signals from said first and third means.

15. Electrical circuitry as in claim 14, further including:
- (e) time delay means electrically interposed between said third and fourth means, said time delay means being adapted to delay for a predetermined interval of time the communication to said fourth means of a change in output signal of said third means.

16. Electrical circuitry as in claim 15, further including:
- (f) said time delay means being adapted to delay communication to said fourth means of a change in output signal of said third means for an interval of time substantially equal to the time required for said motor to reach its rated speed.

17. Electrical circuitry as in claim 15, further including:
- (f) said time delay means being adapted to delay communication to said fourth means of a change in output signal of said third means at least for an interval of time substantially equal to the time required for the output voltage of said electrical source of power to increase from 0 volts to the rated output voltage of said electrical source of power.

18. Electrical circuitry as in claim 15, further including:
- (f) said time delay means being adapted to delay communication to said fourth means of a change in output signal of said third means at least for an interval of time substantially equal to the time required for the output voltage of said electrical source of power to increase from the predetermined value of output voltage of said electrical source of power determinative of the output signal of said second means to the rated output voltage of said electrical source of power.

19. Electrical circuitry as in claim 15, further including:
- (f) said time delay means requiring an interval of time for reset after a change in its output signal,
- (g) the time interval required for the value of the output voltage of the electrical source of power to change from the predetermined value of output voltage of the electrical source of power determinative of the output signal of said second means to 0 volts and back to said predetermined value being at least equal substantially to the interval of time for reset of said time delay means.

20. Electrical circuitry as in claim 16, further including:
(g) said time delay means requiring an interval of time for reset after a change in its output signal,
(h) the time interval required for the value of the output voltage of the electrical source of power to change from the predetermined value of output voltage of the electrical source of power determinative of the output signal of said means to 0 volts and back to said predetermined value being at least equal substantially to the interval of time for reset of said time delay means.

21. Electrical circuitry as in claim 17, further including:
(g) said time delay means requiring an interval of time for reset after a change in its output signal,
(h) the time interval required for the value of the output voltage of the electrical source of power to change from the predetermined value of output voltage of the electrical source of power determinative of the output signal of said second means to 0 volts and back to said predetermined value being at least equal substantially to the interval of time for reset of said time delay means.

22. Electrical circuitry as in claim 18, further including:
(g) said time delay means requiring an interval of time for reset after a change in its output signal,
(h) the time interval required for the value of the output voltage of the electrical source of power to change from the predetermined value of output voltage of the electrical source of power determinative of the output signal of said second means to 0 volts and back to said predetermined value being at least equal substantially to the interval of time for reset of said time delay means.

23. In association with a reversible rolling mill driven by a reversing D.C. motor powered and controlled by an electrical source of D.C. power of reversible polarity having output terminals with an output voltage across said output terminals adjustable between 0 volts and a rated voltage, which reversible rolling mill is automatically controlled by an automatic control apparatus which is adapted to emit a first output signal when the mill is decelerating and a second output signal at other times, electrical circuitry for detecting the presence or absence of an ingot in the reversible rolling mill corresponding respectively to mechanical load and mechanical no-load conditions of said motor, which circuitry is further adapted to signal the presence or absence of the ingot to the automatic control apparatus, said electrical circuitry comprising:
(a) first static switch means electrically associated with the armature of said motor and responsive to the armature current flowing therein, said first static switch means being adapted to emit a first output signal in response to armature currents corresponding to a mechanical no-load condition of said motor and a second output signal in response to armature currents corresponding to a mechanical load condition of said motor,
(b) second static switch means electrically associated with the output terminals of said electrical source and responsive to the output voltage of said electrical source, said second static switch means being adapted to emit a first output signal in response to electrical source output voltages below a predetermined value and a second output signal in response to electrical source output voltages above the said predetermined value,
(c) third static switch means electrically associated with said automatic control apparatus and with said second static switch means and responsive to the output signals of said automatic control apparatus and said second static switch means, said third static switch means being adapted to emit a first output signal in response only to the combination of a second output signal from said automatic control apparatus and a second output signal from said second static switch means, said third static switch means being further adapted to emit a second output signal in response to all other combinations of output signals from said automatic control apparatus and said second static switch means,
(d) fourth static switch means electrically associated with said first and third static switch means and responsive to the output signals of said first and third static switch means, said fourth static switch means being adapted to emit a first output signal indicative of the presence of an ingot in the reversible rolling mill in response only to the combination of a second output signal from said first static switch means and a first output signal from said third static switch means, said fourth static switch means being further adapted to emit a second output signal in response to all other combinations of output signals from said first and third static switch means,
(e) time delay means electrically interposed between said third and fourth static switch means,
(f) said time delay means being adapted to delay communication to said fourth static switch means of a change in output signal of said third static switch means at least for an interval of time substantially equal to the time required for the output voltage of said electrical source to increase from the predetermined value of output voltage of said electrical source determinative of the output signal of said second static switch means to the rated output voltage of said electrical source,
(g) said time delay means requiring an interval of time for reset after a change in its output signal,
(h) the time interval required for the value of the output voltage of the electrical source to change from the predetermined value of output voltage of the electrical source of one polarity determinative of the output signal of said second static switch means through 0 volts to said predetermined value of opposite polarity being at least equal substantially to the interval of time for reset of said time delay means.

24. In association with a reversible rolling mill driven by a reversing D.C. motor powered and controlled by an electrical source of D.C. power of reversible polarity having output terminals with an output voltage across said output terminals adjustable between 0 volts and a rated voltage, which reversible rolling mill is automatically controlled by an automatic control apparatus which is adapted to emit a first output signal when the mill is decelerating and a second output signal at other times, electrical circuitry for detecting the presence or absence of an ingot in the reversible rolling mill corresponding respectively to mechanical load and mechanical no-load conditions of said motor, which circuitry is further adapted to signal the presence or absence of the ingot to the automatic control apparatus, said electrical circuitry comprising:
(a) first logic "isolated input" means electrically associated with the commutating field winding of said motor and responsive to the armature current flowing in said motor, said first logic "isolated input" means being adapted to emit a first output signal in response to armature currents corresponding to a mechanical no-load condition of said motor and a second output signal corresponding to a mechanical load condition of said motor,
(b) second logic "isolated input" means electrically associated with the output terminals of said electrical source and responsive to the output voltage of said electrical source, said second logic "isolated input" means being adapted to emit a first output signal in response to electrical source output voltages below a predetermined value and a second output signal in response to electrical source voltages above the said predetermined value, (c) first logic "inverting and" means electrically associated with said automatic control apparatus and with said second logic "isolated input" means and responsive to the output signals of said automatic control apparatus and said second logic "isolated input" means, said first logic "inverting and" means being adapted to emit a first output signal in response only to the combination of a second output signal from said automatic control apparatus and a second output signal from said second logic "isolated input" means, said first logic "inverting and" means being further adapted to emit a second output signal in response to all other combinations of output signals from said automatic control apparatus and said second logic "isolated input" means, (d) second logic "inverting and" means electrically associated with said first logic "isolated input" means and said first logic "inverting and" means and responsive to the output signals of said first logic "isolated input" means and said first logic "inverting and" means, said second logic "inverting and" means being adapted to emit a first output signal indicative of the presence of an ingot in the reversible rolling mill in response only to the combination of a second output signal from said first logic "isolated input" means and a first output signal from said first logic "inverting and" means, said second logic "inverting and" means being further adapted to emit a second output signal in response to all other combinations of output signals from said first logic "isolated input" means and said first logic "inverting and" means, (e) logic "inverting time delay" means electrically interposed between said first and second logic "inverting and" means, (f) said logic "inverting time delay" means being adapted to delay communication to said second logic "inverting and" means of a change in output signal of said first logic "inverting and" means for an interval of time substantially equal to the time required for the output voltage of the electrical source to increase from the predetermined value of output voltage of said electrical source determinative of the output signal of said second logic "isolated input" means to the rated output voltage of said electrical source, (g) said logic "inverting time delay" means requiring an interval of time for reset after a change in its output signal, (h) the time interval required for the value of the output voltage of the electrical source to pass from the predetermined value of output voltage of said electrical source of one polarity determinative of the output signal of said second logic "isolated input" means through 0 volts to said predetermined value of opposite polarity being at least equal substantially to the interval of time for reset of said logic "inverting time delay" means.

25. In association with a reversible rolling mill driven by a reversing D.C. motor powered and controlled by an electrical source of D.C. power of reversible polarity having output terminals with an output voltage across said output terminals adjustable between 0 volts and a rated voltage, which reversible rolling mill is automatically controlled by an automatic control apparatus which is adapted to emit a first output signal when the mill is being decelerated and a second output signal at other times electrical circuitry for detecting the presence or absence of an ingot in the reversible rolling mill corresponding respectively to mechanical load and mechanical no-load conditions of said motor, which circuitry is further adapted to signal the presence or absence of the ingot to the automatic control apparatus, said electrical circuitry comprising:

(a) first logic "isolated input" means electrically associated with the commutating field winding of said motor and responsive to the armature current flowing in said motor, said first logic "isolated input" means being adapted to emit a first output signal in response to armature currents corresponding to a mechanical no-load condition of said motor and a second output signal corresponding to a mechanical load condition of said motor, (b) second logic "isolated input" means electrically associated with the output terminals of said electrical source and responsive to the output voltage of said electrical source, said second logic "isolated input" means being adapted to emit a first output signal in response to electrical source output voltages below a predetermined value and a second output signal in response to electrical source voltages above the said predetermined value, (c) first logic "inverting and" means electrically associated with said automatic control apparatus and with said second logic "isolated input" means and responsive to the output signals of said automatic control apparatus and said second logic "isolated input" means, said first logic "inverting and" means being adapted to emit a first output signal in response only to the combination of a second output signal from said automatic control apparatus and a second output signal from said second logic "isolated input" means, said first logic "inverting and" means being further adapted to emit a second output signal in response to all other combinations of output signals from said automatic control apparatus and said second logic "isolated input" means, (d) second logic "inverting and" means electrically associated with said first and second logic "isolated input" means and responsive to the output signals of said first and second logic "isolated input" means, said second logic "inverting and" means being adapted to emit a first output signal in response only to the combination of a second output signal from said first logic "isolated input" means and a second output signal from said second logic "isolated input" means, said second logic "inverting and" means being further adapted to emit a second output signal in response to all other combinations of output signals from said first and second logic "isolated input" means, (e) logic "inverting time delay" means electrically associated with said first logic "inverting and" means and responsive to the output signals of said first logic "inverting and" means, said logic "inverting time delay" means being adapted to emit a first output signal in response to a first output signal from said first logic "inverting and" means and a second output signal in response to a second output signal from said first logic "inverting and" means, (f) third logic "inverting and" means electrically associated with said second logic "inverting and" means and said logic "inverting time delay" means and responsive to the output signals of said second logic "inverting and" means and said logic "inverting time delay" means, said third logic "inverting and" means being adapted to emit a first output signal indicative of the presence of an ingot in the reversible rolling mill in response only to the combination of a first output signal from said second logic "inverting and" means and a first output signal from said logic "inverting time delay" means, said third logic "inverting and" means being further adapted to emit a second output signal in response to all other combinations of output signals from said second logic "inverting and" means and said logic "inverting time delay" means, (g) said logic "inverting time delay" means being adapted to delay a change in its output signal in response to a change in the output signal of said first logic "inverting and" means for an interval of time substantially equal to the time required for the output voltage of the electrical source to increase from the predetermined value of output voltage of said electrical source determinative of the output signal of said second logic "isolated input" means to the rated output voltage of said electrical source, (h) said logic "inverting time delay" means requiring an interval of time for reset after a change in its output signal, (i) the time interval required for the value of the output voltage of the electrical source to pass from the predetermined value of output voltage of said electrical source of one polarity determinative of the output signal of said second logic "isolated input" means through 0 volts to said predetermined value of opposite polarity being at least equal substantially to the interval of time for reset of said logic "inverting time delay" means.

References Cited by the Examiner
UNITED STATES PATENTS

| | | | |
|---|---|---|---|
| 2,329,538 | 9/1943 | Huston | 318—143 |
| 2,537,171 | 1/1951 | Stoltz et al. | 318—143 |
| 2,677,085 | 4/1954 | Sikorra | 318—144 X |
| 2,809,336 | 10/1957 | Allbert | 318—6 X |
| 2,913,651 | 11/1959 | Smith et al. | 318—282 |
| 3,104,350 | 9/1963 | Malick | 318—285 X |
| 3,108,214 | 10/1963 | Wilkerson | 318—144 |
| 3,155,891 | 11/1964 | Rosa | 318—143 |

ORIS L. RADER, *Primary Examiner.*

T. LYNCH, *Assistant Examiner.*